US009076150B1

(12) United States Patent
Goslar

(10) Patent No.: US 9,076,150 B1
(45) Date of Patent: Jul. 7, 2015

(54) SYSTEM AND METHOD FOR ONLINE SALES BY HOSTING SITE WITH RSS FEEDS CONTROLLED BY USER/BUYER

(76) Inventor: Joel Goslar, Mountain View, CA (US)

( * ) Notice: Subject to any disclaimer, the term of this patent is extended or adjusted under 35 U.S.C. 154(b) by 1965 days.

(21) Appl. No.: 12/214,599

(22) Filed: Jun. 21, 2008

Related U.S. Application Data

(60) Provisional application No. 61/003,229, filed on Nov. 16, 2007.

(51) Int. Cl.
*G06Q 30/00* (2012.01)
*G06Q 30/02* (2012.01)

(52) U.S. Cl.
CPC ........................................ *G06Q 30/02* (2013.01)

(58) Field of Classification Search
None
See application file for complete search history.

(56) References Cited

U.S. PATENT DOCUMENTS

| | | |
|---|---|---|
| 6,820,802 B2 | 11/2004 | Biggar et al. |
| 6,836,765 B1 | 12/2004 | Sussman |
| 7,003,501 B2 | 2/2006 | Ostroff |
| 7,089,592 B2 | 8/2006 | Adjaoute |
| 7,190,815 B2 | 3/2007 | Zank et al. |
| 7,225,156 B2 | 5/2007 | Fisher et al. |
| 2004/0019564 A1* | 1/2004 | Goldthwaite et al. .......... 705/44 |
| 2007/0094082 A1* | 4/2007 | Yruski et al. .................... 705/14 |
| 2008/0147619 A1* | 6/2008 | O'Malley .......................... 707/3 |

OTHER PUBLICATIONS

Web Syndication, Wikipedia, 2007, 1 page.
Martin, The Beginner's Guide to RSS, Internet, 2007, 4 pages.
RSS, Wikipedia, 2007, 6 pages.
The Big Lazy Mall, Internet, 2007, 2 pages.
Grill, Jim, Fighting Online Credit Card Fraud, Internet, jimgrill.com, 2001, 5 pages.
Mehta, Raj et al., Payment on Online, The Guide, Internet, 1999, 3 pages.

* cited by examiner

*Primary Examiner* — Peter L Ludwig
(74) *Attorney, Agent, or Firm* — Stan Collier, Esq.

(57) ABSTRACT

Online purchases by users/buyers are facilitated by an online hosting company operating an online website for providers/sellers/merchants. The merchant establishes criteria used to identify potential buyers. The online company would maintain a RSS feeder means. The user/buyer selects criteria at the online company regarding products and/or services desired and would be notified of availability by use of the RSS feed. The online company would match the user/buyer and the provider/merchant based upon the criteria provided by both. The online company would also provide secure credit/debit card pre-approval for user/buyers by establishing an account therewith. A notice on the merchant website would alert the user/buyer that the merchant is a participant/member in the online company. If the merchant is not a member, the user/buyer would be redirected to the merchant website.

10 Claims, 22 Drawing Sheets

PRIOR ART

FIG. 2

Checkout Page for Website, Payment Information

---

(company logo, information, navigation tabs, etc. area)

---

Credit Card

Card Type    ◯ Visa     ◯ Mastercard

◯ Discover ◯ American Express

Card Number [ ]

Expiration Date [ ▽ ] [ ▽ ]

Card ID [ ]

CONTINUE

---

(Additonal Area for Promtions, Notices, Trademarks, Copyright)

PRIOR ART

Review and Order Page for Website

PRIOR ART

FIG. 4

Confirmation Page for Website (company logo, information, navigation tabs, etc. area)

Confirmation Number ⬚

Product Purchased ⬚

Shipping and Delivery Information ⬚

Notices ⬚

RETURN TO SHOPPING

LOGOUT

(Additonal Area for Promtions, Notices, Trademarks, Copyright)

PRIOR ART

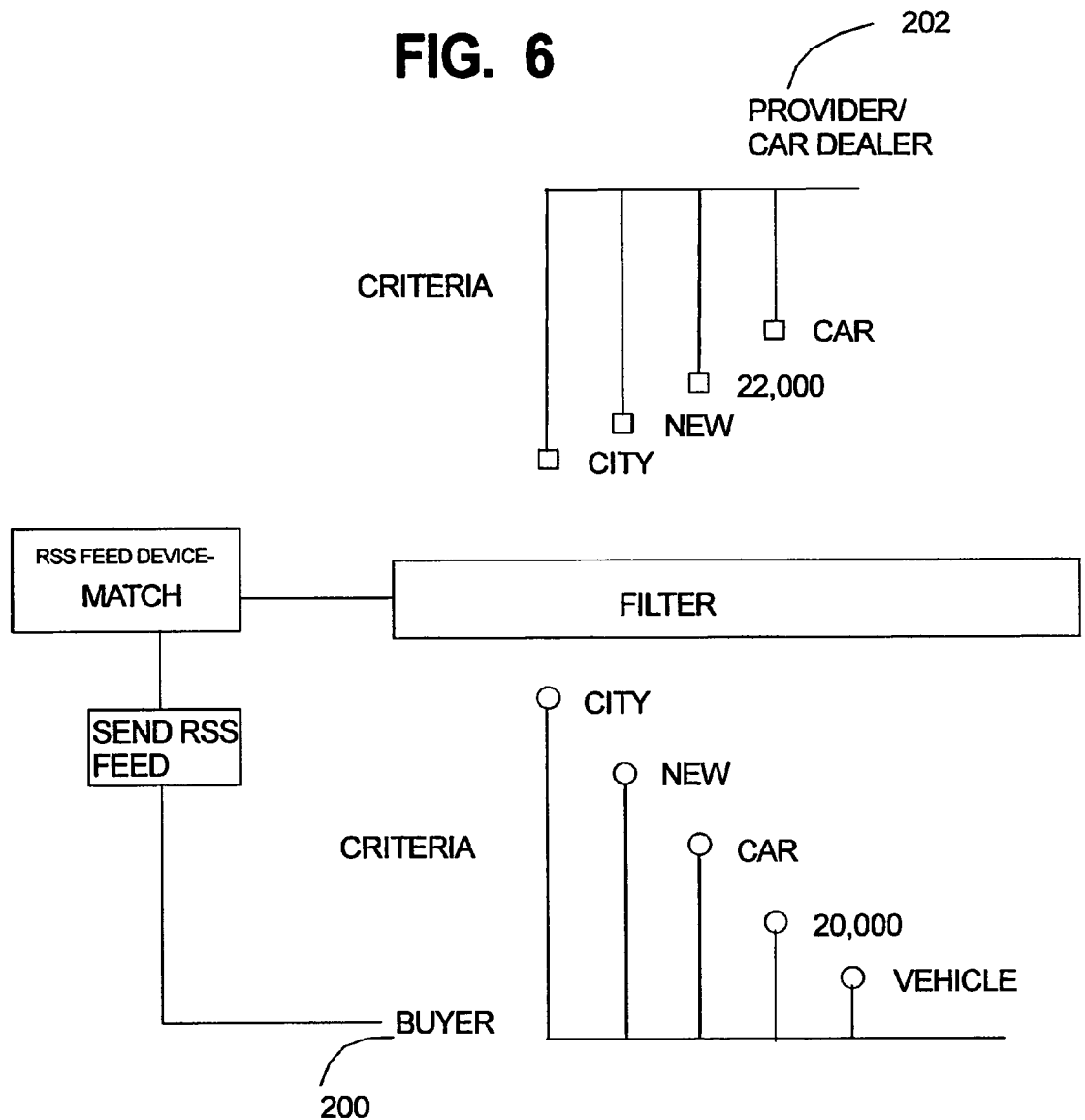

myabuy.com

- Myabuy.com
- Sign Up

If it's original, it's on myabuy.com!

Businesses can list with myabuy.com and link up with local and international customers. Customers and clients worldwide can link up with providers. Advertisers can also reach buyers and sellers in specific market sectors... Business finds buyers. Buyers find choice.

Myabuy RSS lets businesses create an ad in minutes (no programming required) and publish the contents as a streaming RSS feed to interested buyers through any feed reader.

Already a member?

Log in!

Username: [          ]

Password: [          ]

My Role:
○ Buyer   ○ Business Provider   ○ Administrator

[ Login ]

Forgot your username/password?

Not a Member?

Join for free!

Join as a buyer

Join as a business provider

Advertise on myabuy RSS feeds only! (No need to log in!)

Search for friends on myabuy.com

Product/Service Categories:

FIG. 7A

- Publications Outside U.S.
- Natural Beauty...Products
- Hotels
- Boutique Designers
- The Art Scene
- Latest Software
- OTC Pharmaceuticals (ISO accredited)
- Gadgets
- Sports
- Tailor-Made Fashion
- Consultants
- Publications
- Music
- Films
- Addictive Games
- Fine Dining
- Cosmetic, Elective Surgery Outside U.S
- Northeast Cosmetic, Elective Surgery
- Midwest Cosmetic, Elective Surgery
- West Cosmetic, Elective Surgery
- South Cosmetic, Elective Surgery
- Hotels Outside U.S.
- Interior Decorators
- Home Decor
- Vehicles
- Professional Services
- Fine Dining Outside U.S.

About us: Myabuy, LLC was established in 2006 as a free, safe organized social utility network where friends can meet, shop, share, communicate and discover the finest vendors imaginable.

"Myabuy.com respects the confidentiality of buyers and will not share their personal information with paid advertisers. See our privacy policy in the myabuy terms of service."

© myabuy.com, 2007. Contact us at jovius@myabuy.com.

FIG. 7B

☐ Sports

☐ Tailor-Made Fashion

☐ Consultants

☐ Publications

☐ Music

☐ Films

☐ Addictive Games

☐ Fine Dining

☐ Cosmetic, Elective Surgery Outside U.S

☐ Northeast Cosmetic, Elective Surgery

☐ Midwest Cosmetic, Elective Surgery

☐ West Cosmetic, Elective Surgery

☐ South Cosmetic, Elective Surgery

☐ Hotels Outside U.S.

☐ Interior Decorators

☐ Home Decor

☐ Vehicles

☐ Professional Services

☐ Fine Dining Outside U.S.

I agree to myabuy.com's terms of service. The paid listings and advertisements on myabuy.com in no way constitute a referral or endorsement of myabuy.com. All information herein is general in nature, and does not create a buyer/seller relationship with myabuy.com. ☐

[ Okay! ]

Myabuy.com respects the confidentiality of buyers and will not share their personal information with paid advertisers. See our privacy policy in the myabuy terms of service agreement.

FIG. 8B

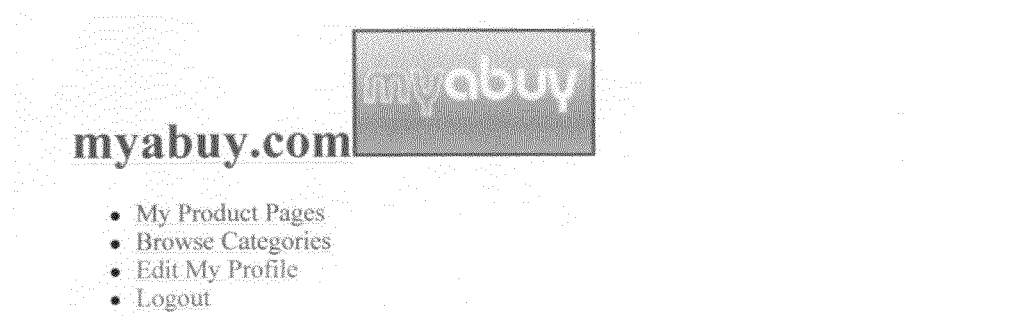

myabuy.com

- My Product Pages
- Browse Categories
- Edit My Profile
- Logout

You are logged in as Hotel California

FIG. 9

Click a category to view vendors selling products in that category

Show All Products

- Publications Outside U.S.
- Natural Beauty...Products
- Hotels
- Boutique Designers
- The Art Scene
- Latest Software
- OTC Pharmaceuticals (ISO accredited)
- Gadgets
- Sports
- Tailor-Made Fashion Next page © myabuy.com, 2007. Contact us at jovius@myabuy.com.

Choose one category for your products:

○ Publications Outside U.S.
○ Natural Beauty...Products
○ Hotels
○ Boutique Designers
○ The Art Scene
○ Latest Software
○ OTC Pharmaceuticals (ISO accredited)
○ Gadgets
○ Sports
○ Tailor-Made Fashion
○ Consultants
○ Publications
○ Music
○ Films
○ Addictive Games
○ Fine Dining
○ Cosmetic, Elective Surgery Outside U.S
○ Northeast Cosmetic, Elective Surgery
○ Midwest Cosmetic, Elective Surgery
○ West Cosmetic, Elective Surgery
○ South Cosmetic, Elective Surgery
○ Hotels Outside U.S.
○ Interior Decorators
○ Home Decor
○ Vehicles
○ Professional Services
○ Fine Dining Outside U.S.

FIG. 11B

*This authorized business/trademarked category may not be used by unaffiliated advertisers without the express written consent of the business/trademark owner. Myabuy encourages all users to report any violations here or to jovius@myabuy.com. Myabuy reserves the right to act immediately against unauthorized advertisers and report them to the proper authorities.

I agree that the typed signature represents my single electronic signature. I accept the legally binding myabuy.com terms of service and I authorize the transaction. I swear, the information contained in my listing and/or advertisement is legitimate and legal I understand documents signed using my typed name will have the same legally binding effect as a signature using pen and paper.

☐ [Okay!]

© myabuy.com, 2007. Contact us at jovius@myabuy.com.

FIG. 11C myabuy.com

- Myabuy.com
- Sign Up

New feed

Product Name [          ]

Feed text [          ]

Days to display [          ]

URL to link to [          ]

Category:

○ Publications Outside U.S.

○ Natural Beauty...Products

○ Hotels

○ Boutique Designers

○ The Art Scene

○ Latest Software

○ OTC Pharmaceuticals (ISO accredited)

○ Gadgets

○ Sports

○ Tailor-Made Fashion

○ Consultants

FIG. 12A

○ Publications

○ Music

○ Films

○ Addictive Games

○ Fine Dining

○ Cosmetic, Elective Surgery Outside U.S

○ Northeast Cosmetic, Elective Surgery

○ Midwest Cosmetic, Elective Surgery

○ West Cosmetic, Elective Surgery

○ South Cosmetic, Elective Surgery

○ Hotels Outside U.S.

○ Interior Decorators

○ Home Decor

○ Vehicles

○ Professional Services

○ Fine Dining Outside U.S.

I agree to myabuy.com's terms of service ☐ [ Okay ]

© myabuy.com, 2007. Contact us at jovius@myabuy.com.

FIG. 12B

Product Image: [        ]     [Browse...]
Description: [        ]

Category:

○ Publications Outside U.S.

○ Natural Beauty...Products

○ Hotels

○ Boutique Designers

○ The Art Scene

○ Latest Software

○ OTC Pharmaceuticals (ISO accredited)

○ Gadgets

○ Sports

○ Tailor-Made Fashion

○ Consultants

○ Publications

○ Music

○ Films

○ Addictive Games

○ Fine Dining

○ Cosmetic, Elective Surgery Outside U.S

○ Northeast Cosmetic, Elective Surgery

○ Midwest Cosmetic, Elective Surgery

FIG. 14B

○ West Cosmetic, Elective Surgery

○ South Cosmetic, Elective Surgery

○ Hotels Outside U.S.

○ Interior Decorators

○ Home Decor

○ Vehicles

○ Professional Services

○ Fine Dining Outside U.S.

*This authorized business/trademarked category may not be used by unaffiliated advertisers without the express written consent of the business/trademark owner. Myabuy encourages all users to report any violations here or to jovius@myabuy.com. Myabuy reserves the right to act immediately against unauthorized advertisers and report them to the proper authorities.

[ save ]

Delete Manage RSS Edit Image Name Description Category

© myabuy.com, 2007. Contact us at jovius@myabuy.com.

FIG. 14C

FIG. 15
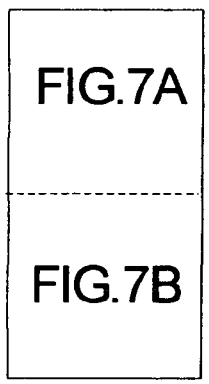
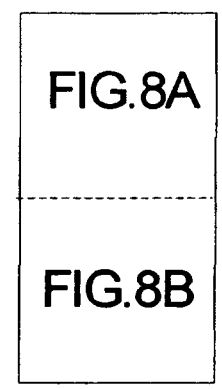
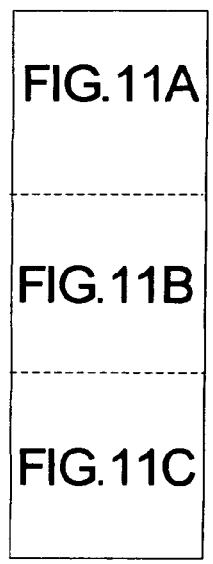
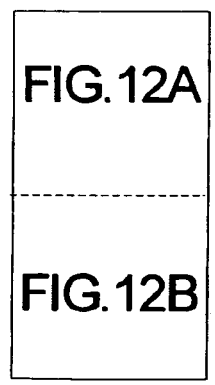
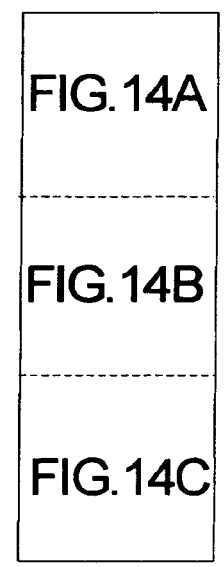

SYSTEM AND METHOD FOR ONLINE SALES BY HOSTING SITE WITH RSS FEEDS CONTROLLED BY USER/BUYER

CROSS-REFERENCE TO RELATED APPLICATIONS

The present invention is related to provisional patent application Ser. No. 61/003,229, filed Nov. 16, 2007, with the same title, and is incorporated by reference herein.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable.

BACKGROUND OF THE INVENTION

1. Field of the Invention

The present invention relates to the sales of merchandise on the Internet, and, in particular, to sales from online stores, i.e., e-shops, and, in greater particularity, to sales from stores that are members of a host mall that provides directed advertising as a part of the e-commerce environment.

2. Description of the Prior Art

An online commercial transaction between a user/buyer and a provider/merchant takes places over a communications network, in particular, the Internet wherein each party normally has a computer connected thereto. In order for the user to find the website of the provider of a particular product and/or service, the user types one or more words into a search engine. This usually results in numerous hits sometimes even millions. Preferred advertisers/merchants may be listed at the top of each page to lead users to their sites whether they are, in fact, the best website for this product and/or service. Thus the user is forced into reviewing many websites to find an appropriate one for that product and/or service. If the user/buyer/customer desires to purchase/order goods/services, the user must enter certain personal financial information as related to a particular credit/debit card into the website. The merchant takes this personal financial information and sends it to the banking system for approval. After approval, the merchant ships the good as directed by the user.

It is further possible that the website of the provider/merchant does have the ability to provide RSS feed. This feature normally requires that the provider/merchant employ the services of a programming source to create the RSS feed and update as necessary. Typical providers would not have this experience. Again, the problem is that the user/buyer must find this website and then subscribe to the RSS feed from that website. Another source of difficulty is that the user/buyer may be in need of many products and/or services and thus would be forced to find websites for each and then subscribe to each of these RSS feeds, if they are even available. It is further unlikely that the feed will be directed solely at the product desired. A recent report has indicated that only about 10% of the merchant websites even have the ability to provide RSS feeds reflecting the additional costs and difficulties in keeping this RSS feed updated. In order to avoid this issue, many merchants subscribe to other services to obtain users. Two of these services are pay-per-click (PPC) and pay-per-impression (PPI). These services and indeed costly and can result in no more users than normal and even result in fraudulent activity such as multiple clicking on a competitor's website to drive up the costs. The main desire of a merchant is to be linked to a user who will buy the products and/or services offered. The problem is the linking between these two entities.

With the advent of increased online transactions, this has presented an outstanding opportunity, as compared to face-to-face transactions, for illegal activity centering on procuring personal credit/debit information by many different means well known to one skilled in that art such as spyware. The more websites visited by the user/buyer, the greater the chance of this information being stolen.

The illegal user, meaning a person who has no legal right to use the credit/debit card, normally obtains this information by intrusive activities over a communications network as compared to physical activities such as theft of card information from receipts, etc. The communications network may include any network for transferring information via electrical means (e.g., on wires), electromagnetic means (e.g., microwave transmissions by satellite or point-to-point ground locations using antennae) and optical means (e.g., fiber optic cables) technologies. Many people fear the theft of personal information and information related to financial issues when using the Internet and will thus avoid using the Internet, or will not access sites having interactive inputs, or will not enter any personal or financial information.

Although users are legally protected from the illegal use of their cards, banks, credit/debit card companies, and merchants are not protected. A user must report this illegal use within 60 days, typically, to receive refunds. Encryption of transmitted data and the use of dedicated lines by financial institutions offer a high level of protection, but merchants who use the world wide web (WVVW) will still bear the burden of Internet fraud by the loss of merchandise and chargebacks to their accounts.

A conventional transaction between an online user/buyer and a merchant requires the transfer of personal financial information. Referring to FIG. 1, a user/buyer 10 enters a website 12 of the provider/merchant 14 and selects the merchandise to purchase by adding it to a cart, for example. A typical checkout screen 16 is shown in FIG. 2 and presents a standard form for submitting credit/debit card information such as card type, card number, expiration date, and a unique identifier on the card being either a three or four digit number that the user 10 has obtained from the issuing card bank 18. The merchant 14 then submits this information for authorization to a credit/debit card clearing agency 16 that verifies this information from the issuing bank 18. Upon authorization to the merchant 12, the user 10 is required to complete other screen pages during checkout or edit information presented therein. Further information regarding delivery of the goods/services is requested from the user 10 on a second ordering screen such as shown in FIG. 3. Once the user selects the order button 20 of an approved purchase, a confirmation screen page such as shown in FIG. 4 is sent to the user 10. The merchant 12 then submits this information to a shipper 22 that has the goods/services delivered as requested. This transaction involves the transfer of a significant amount of information between the parties, some of which the user 10 might find personal and private. It is further clear that this information may be retained for future use by the merchant 12, the clearing agency 16, the issuing card bank 18, and the shipper 22. A detailed discussion of this process and others is explained in U.S. Pat. No. 7,069,249, issued Jun. 27, 2006, entitled, "Electronic Purchase of Goods over a Communications Network including Physical Delivery while Securing Private and Personal Information of the Purchasing Party," to Stolfo et al. This patent is incorporated by reference.

In a typical scenario, the credit card thief obtains a credit card by stealing a wallet or pursue or by use of a credit card receipt. This may result from an unscrupulous sales clerk who records the 3 or 4 digit printed number on the back of the card since this number is not transferred by the machine that imprints the raised numbers and letters to the receipt. This type of theft does not appear until the credit card statement is received by the user. With this information, the thief can make purchases online, but must change the shipping address. Until the credit card is cancelled, the thief will continue to exhaust the account until the credit limit is reached. If the merchandise is delivered, it will most likely never be returned. The victim user must then dispute the unauthorized purchases and may or may not, depending on their bank's aggressiveness, receive a credit on their account within 60 days of the theft. This may also be disputed by the e-shop which further delays any resolution. The victim user may be even forced to hire an attorney to pursue this issue. If the dispute is settled in favor of the victim user, the credit account is credited and the account of the merchant is given a chargeback.

Accordingly, there is an established need for an online transaction system between a user and a merchant where a dedicated online company links these entities together.

SUMMARY OF THE INVENTION

The present invention is directed at a system and method for providing an online commercial environment by an online hosting company for providers and users through the use of directed advertising.

The present invention further provides an online source operated by the online hosting company wherein online providers/merchants and users/buyers may be members of the online hosting company for the purpose of enhancing commercial sales of products and/or services.

An object of the present invention is to provide an online resource where directed advertising links online merchants and users/buyers through a filtering process as defined by criteria from the online providers/merchants and the users/buyers.

It is another object of the present invention to provide an online resource for advertising that minimizes programming skills for the online merchants.

It is a further object of the present invention to provide an online resource for the sale of products and/or services between merchants and buyers that minimizes or eliminates online searches, pay-per-click and pay-per-impression requirements.

It is still a further object of the present invention to provide an online resource where spamming is avoided by online merchants and advertising costs are minimized, but still linking users/buyers/customers to appropriate online merchants.

It is yet a further object of the present invention to provide a system for secure commercial transactions with a minimum of complications and issues to online merchants having websites and users/buyers who are purchasing products and/or services with credit/debit cards.

The present invention provides a system and method for online purchases by users/buyers/customers as facilitated by an online hosting company operating an online advertising source for providers/sellers/merchants. The online merchants must be members if the online hosting company provides a member website for the members without websites. This member website would display the variety of products and/or services for sale by the member merchant. The member merchants would also establish multiple criteria used in identifying potential buyers as well as the products and/or services provided. The online hosting company maintains a RSS feeder means for linking customers to merchants through a filtering processes where the customer has identified a desired product and/or service which is available from a provider/merchant.

The online hosting company may assist in online purchases with the use of a secure database(s) having unique user/buyer information therein from the user and thus the user would not be required to divulge personal information that would otherwise be requested by each individual merchant. The user/buyer would further select multiple criteria regarding desired products and/or services and to be notified of them through the use of the RSS feed from the online hosting company. The online hosting company would match up, link, and filter the provide/merchants to the user/buyers based on the criteria provided by both entities. The online hosting company could further act as a credit/debit card pre-approval source and thus the user/buyer would only have to select items for a shopping cart and hit a payment button which would authorize the credit/debit card bank to credit the merchants account. Moneys from the purchases are placed in the merchant's account with appropriate deductions for chargebacks and/or other fees. The user/buyer would establish an account with the online hosting company and provide conventional credit/debit card information along with a user identification name (ID), a unique password (PW), and an electronic signature (ES), if necessary, for purchases. Any and all of this information may be updated and verified by the online company and the user. The member user/buyer would know in advance that a merchant is a member of the Internet hosting company's system as would be indicated by a notice or logo posted therein that this merchant is a member of the online hosting company's system.

Additionally, the merchant having a website hosted by a third party may establish an account with the online hosting company. If the buyer/user selects a product and/or service from this RSS feed, the buyer/user would be redirected to the third party website of the merchant for completing the purchase transaction. In this respect, certain of the services provided by the online hosting company would not be available to a non-member merchant.

The online hosting company may be further able to process all user's bank cards and checking account transactions and maintain control of the entire user payment process with security features for the member users, member merchants and the online hosting company.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 2 is an illustration of a conventional checkout screen page;

FIG. 4 is an illustration of a conventional confirmation screen page;

FIG. 6 is an schematic illustrating the filtering of provider criteria and buyer criteria for sending an RSS feed to the buyer from the online hosting company;

FIG. 7 is composed of FIGS. 7A and 7B that illustrates a typical web home page of an online hosting company according to the present invention, See also FIG. 15;

FIG. 9 illustrates a provider/merchant information page on the website of FIG. 7;

FIG. 12 is composed of FIGS. 12A and 12B that illustrates unique products on a page for the provider/merchant on the website of FIG. 7. See also FIG. 15;

FIG. 15 illustrates the arrangement of the continuation sheets of FIGS. 7, 8, 11, 12 and 14.

Like reference numerals refer to like parts throughout the several views of the drawings.

DETAILED DESCRIPTION OF THE PREFERRED EMBODIMENTS

The present invention is directed at a system and method for providing an online commercial environment by an online hosting company for merchants and users through the use of directed advertising. This system and method further provides an online source operated by the online hosting company wherein online merchants and users may be members of the online hosting company for the purpose of enhancing commercial sales of products and/or services.

Figure 1:
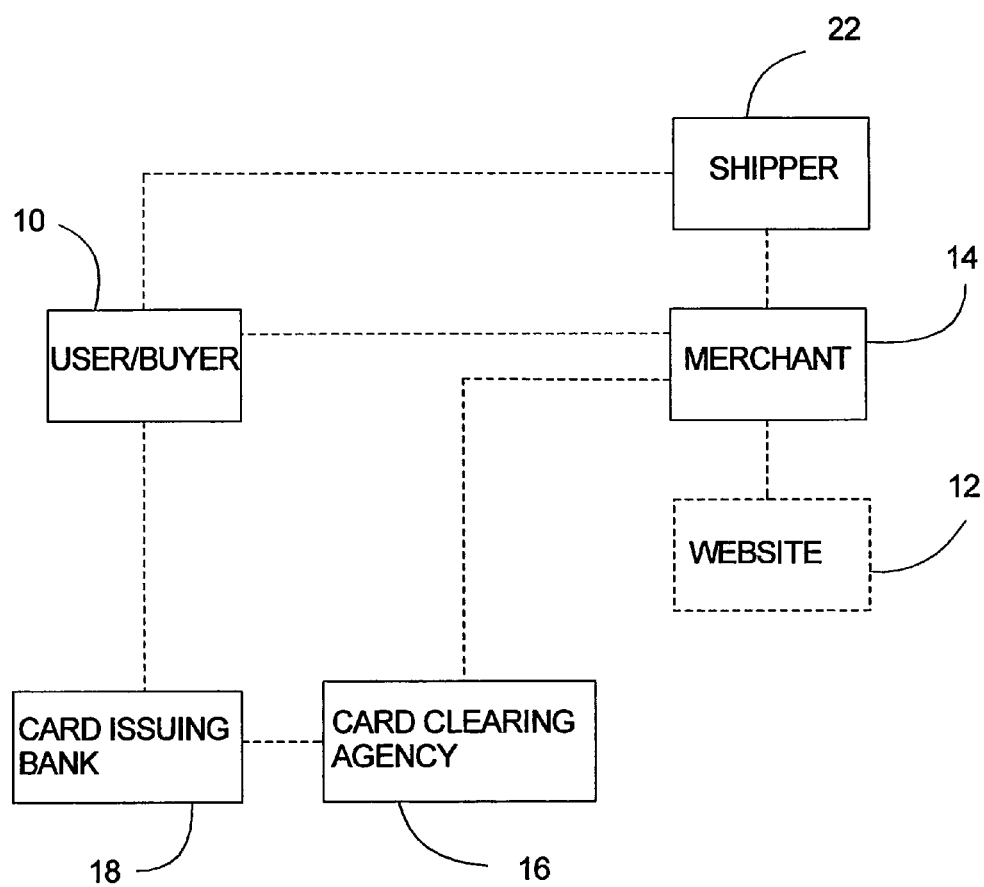
FIG. 1 is a block flow diagram of a typical e-commerce transaction between a customer and a merchant with the use of a credit/debit card.
Figure 3:
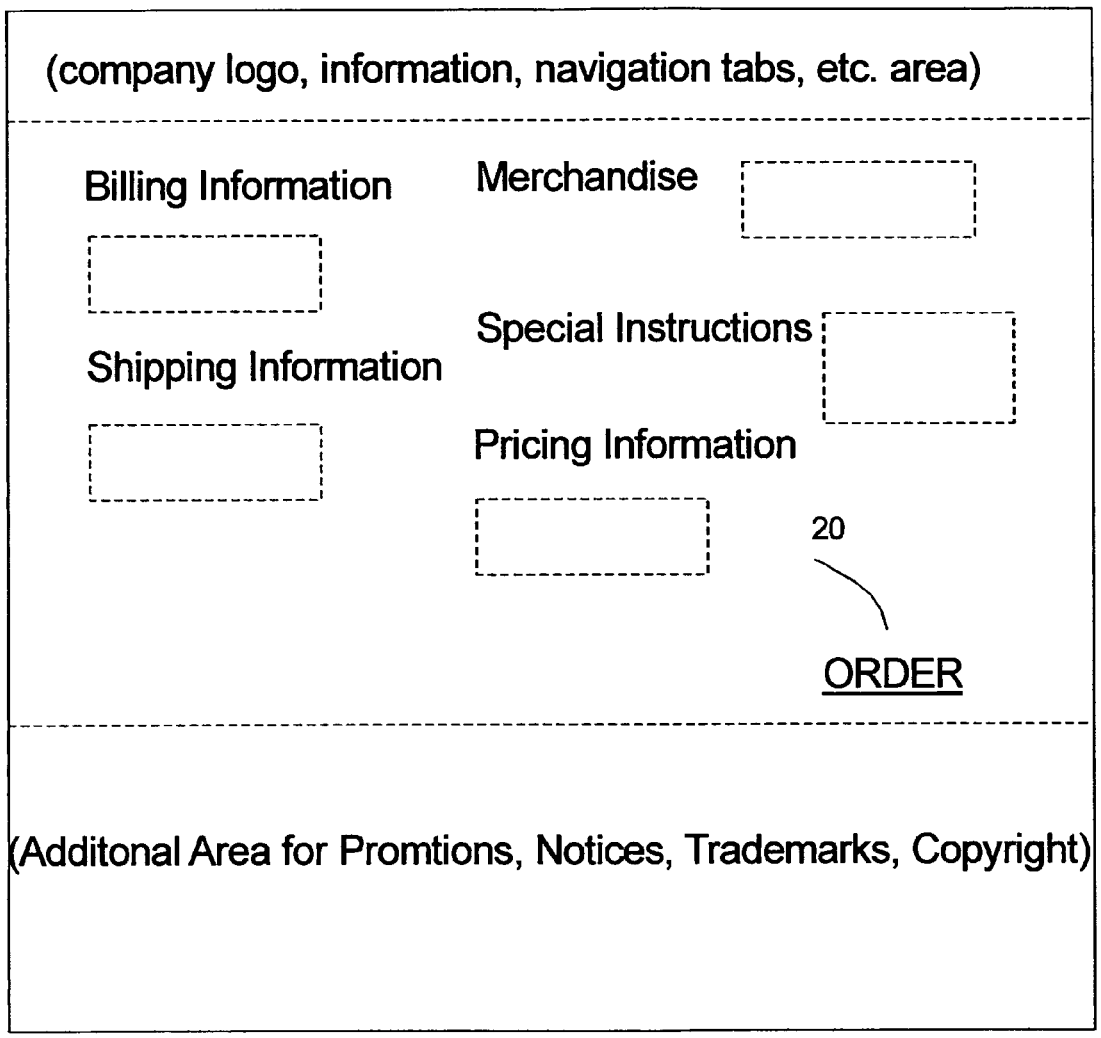
FIG. 3 is an illustration of a conventional ordering screen page.
Figure 5:
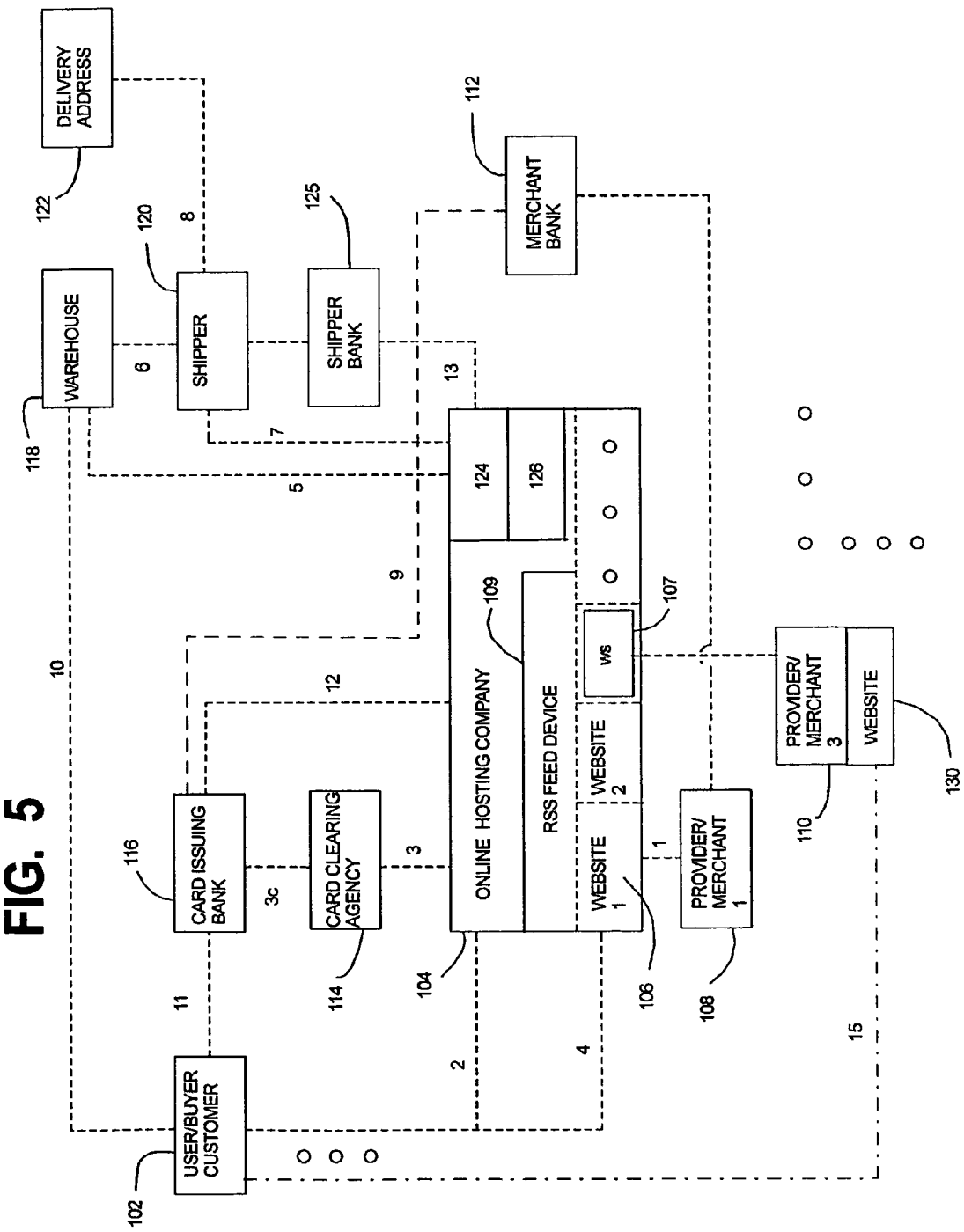
FIG. 5 is a block flow diagram illustrating the parties and steps involved in an e-commerce transaction with the online hosting company in the present invention used directed advertising.

Turning to the drawings, wherein like components are designated by like reference numerals throughout the various figures, attention is initially directed to FIG. 5 that illustrates by a block flow diagram the present invention.

As best shown in FIG. 5, the overall architecture of a system 100 incorporating the invention is illustrated in FIG. 5. The different parties communicate over the Internet and/or secure lines indicated by dashed lines. A member user/buyer/customer has a user device 102 being a computer connects to Internet through an Internet Service Provider (ISP), not shown. The dots below the device 102 indicate a plurality of user devices. An online hosting company with an online device 104 being a computer means for implementing the present invention and may have a plurality of servers for hosting a first website 106 (e-shop) from a first member provider/merchant 108. A second provider/merchant 110 has a website 130 (e-shop), not hosted by the online hosting company. A solid line block 107 indicates that the website is not located on the server of the company 104, but located on another server such as a member merchant may have or another provider may have. Further, within the online hosting company device 104 is a RSS feed device 109 that manages, stores and otherwise processes information from the user/buyer 102 and the provider merchant 108/110. This information would include the user/buyer criteria for product and/or services desired and the provider/merchant criteria for products and/or services offered by the provider/merchant. RSS feed device 109 would further match the user/buyer and the provider/merchant based upon their criteria and then send a RSS feed to the user/buyer.

In the processing of the transactions, the online hosting company 104 communicates to a credit/debit card clearing agency 114 which may be the actual card-issuing bank 116. Once the purchase is completed, the online hosting company 104 would direct that the goods or merchandise held in one or more warehouses 118 be transported by a shipper 120 to a delivery address 122 as dictated by the member user 102. In the following explanation of the present invention, it should be understood that there are a multiple of member users, member merchants, non-member merchants, merchant websites, merchant banks, card issuing banks, warehouses, shippers, etc. The explanation will be directed at a single purchase, and the process assumed the same for other purchases unless otherwise indicated. There is no use of proxy computers or proxy software in the present invention to mask identities since the member users would be identified by their user names to the other parties with the exception of the card clearing agency 114 and card issuing banks 116. All of the necessary account information of the parties in the present invention would be maintained in one or more secure databases 124 of the online hosting company 104.

Figure 8A:
FIG. 8 is composed of FIGS. 8A and 8B that illustrates a user/buyer information page on the website of FIG. 7. See also FIG. 15.

In a sample transaction without any issues of fraud and referring to FIG. 5, the following occurs: Step 1, (this number refers to the numbers on the lines between different blocks in FIG. 5. Also numbers with letters thereafter would be included on the same line, but are considered different communications) the first merchant 108 establishes a merchant account (merchant information stored in an merchant database 126) with the online company 104 with all necessary identifying information as will be shown below. (See FIGS. 7, 11 to 14) The merchant 108, Step 1a, establishes a website 106, uploads the website 106 to the online hosting company's server(s). The merchant's website would typically display screens (FIGS. 1 to 4) for processing of the transaction. The online hosting company 104 would have information as to the merchant's bank 112, the warehouse 118 where the merchandise is stored, and the shippers 120 to be used. Step 2, the user 102 desires to shop at the e-shops hosted by the online company 104. The user 102 is directed to establish a user account with the online company 104 (See FIGS. 7 and 8) and establishes the user/buyer criteria as seen under the category list. This list may be further expanded as necessary. Necessary information as noted above is stored in the user database 124 including such information as credit/debit card available, banks, IP address of the user computer 102, e-mail address, unique user name, unique password, an electronic signature, billing address, and shipping address. Step 3, the online hosting company 104 may act to pre-approve and verify credit/debit card information with the credit/debit card clearing agency 114, and then notify the user 102, Step 2a, at the e-mail address provided by the user 102 that the user is now a member of the online hosting company 104. In the present embodiment, no charges result from becoming a member by the user. In Step 2b, the online hosting company 104 would notify the user/buyer 102 of a match by sending a RSS feed. See FIG. 7, for example, where the user/buyer 200 wants to purchase a new car at a price of about $20,000 in his city. The RSS feed means 109 performs a matching of the criteria and would find a new car dealer 202 has a matching product and then the online hosting company 104 sends an RSS feed to the user/buyer 102. In response to that RSS feed, the user/buyer 102 enters, Step 4, the merchant website 106.

In the event that the provider/merchant 110 has a website 130 upon a different server and if the RSS feed is clicked upon by the user/buyer 102, the user/buyer 102 would be redirected to that website. Step 15. In Step 4a or Step 15a, the member user 102 would select the merchandise to be purchased by clicking on a shopping cart on the e-shop web page. Step 4b or 15b, the member user 102 would be requested to enter identifying information such as user name and password previously selected and provided to the online company 104 on a checkout page. (See FIGS. 1 to 4) In Step 3a, with this information, the company 104 would retrieve the user's information in the user database 124 and would again submit a request to verify credit information with the card clearing agency 114 that would further verify, Step 3b, the member user's credit status with the card issuing bank 116. With the approval from these, Step 12, and no further red flags, the company 104 would retrieve the member user's electronic signature from the user database 124 and transmit this, Step 4c on the Submit Order page to the member user 102 for acknowledgement and requesting this order, Step 4d or Step 15c. Once the member user 102 selects the Order button, Step 4e, a confirmation page is sent to the member user 102, Step 4f or Step 15d. The submit order page would include a billing name and a shipping address as previously entered by the user when the account was opened. If this information is modified by the member user 102, it would be further included on the confirmation page as being changed. The confirmation page would also have thereon a confirmation number. The change in the shipping address may place a red flag on this account for at least 60 days after the issuing card bank 116 submits a billing statement, Step 11, to the member user 102. With this order confirmed, the company 104 would submit a shipping request, Step 5, to the identified warehouse 118 of the merchant 108. With this, the warehouse 118 would request, Step 6, that the shipper 120 pickup the merchandise and have it delivered, Step 8, to the designated delivery address 122. A tracking number would be associated with each shipment. A user name may be associated with this shipment label also. After delivery, the shipper 120 would provide the delivery date to the company 104 with tracking number, Step 7, and, notify the warehouse 118, Step 6a, that the merchandise was delivered. The warehouse 118 and/or shipper 120 would then, Step 10, e-mail the member user 102 that the merchandise was delivered, and the company would further debit the merchandise cost and shipping cost from the member user's card issuing bank 116, Step 12. The online hosting company 104 would at no time be required to provide the member user's real name or address to the merchant unless there was a dispute as to the merchandise delivered. As part of the member user's agreement as to the terms and conditions for membership in the online company 104, the user would agree to be diligent in reviewing all information related to purchases and would be estopped from disputing any transaction unless done within 60 days of the transaction, Step 2b. It should be understood that the screen pages shown are merely illustrative.

Figure 10:
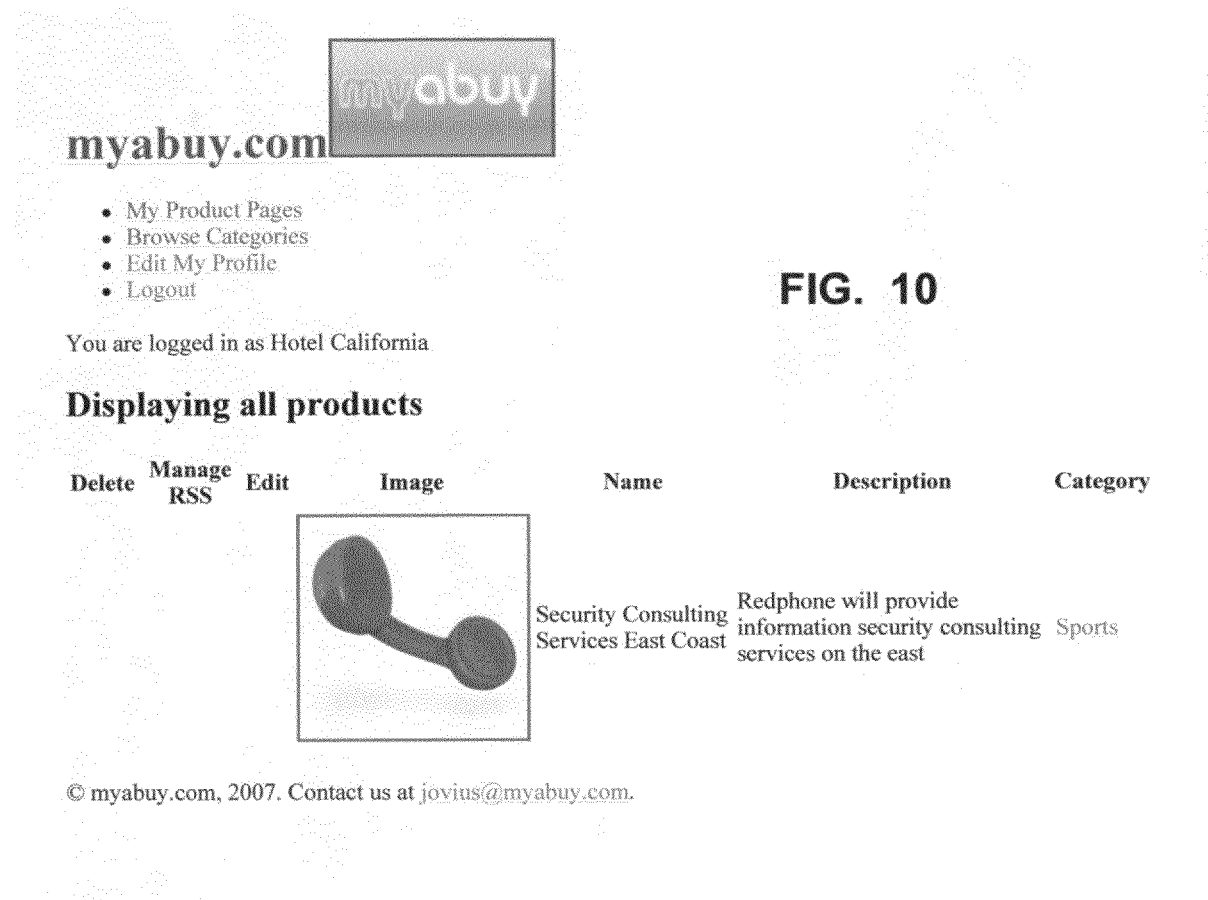
FIG. 10 illustrates a feed page for the provider/merchant on the website of FIG. 7.
Figure 11A:
FIG. 11 is composed of FIGS. 11A, 11B and 11C that illustrates a unique product page for the provider/merchant on the website of FIG. 7 after the product area is selected. See also FIG. 15.
Figure 13:
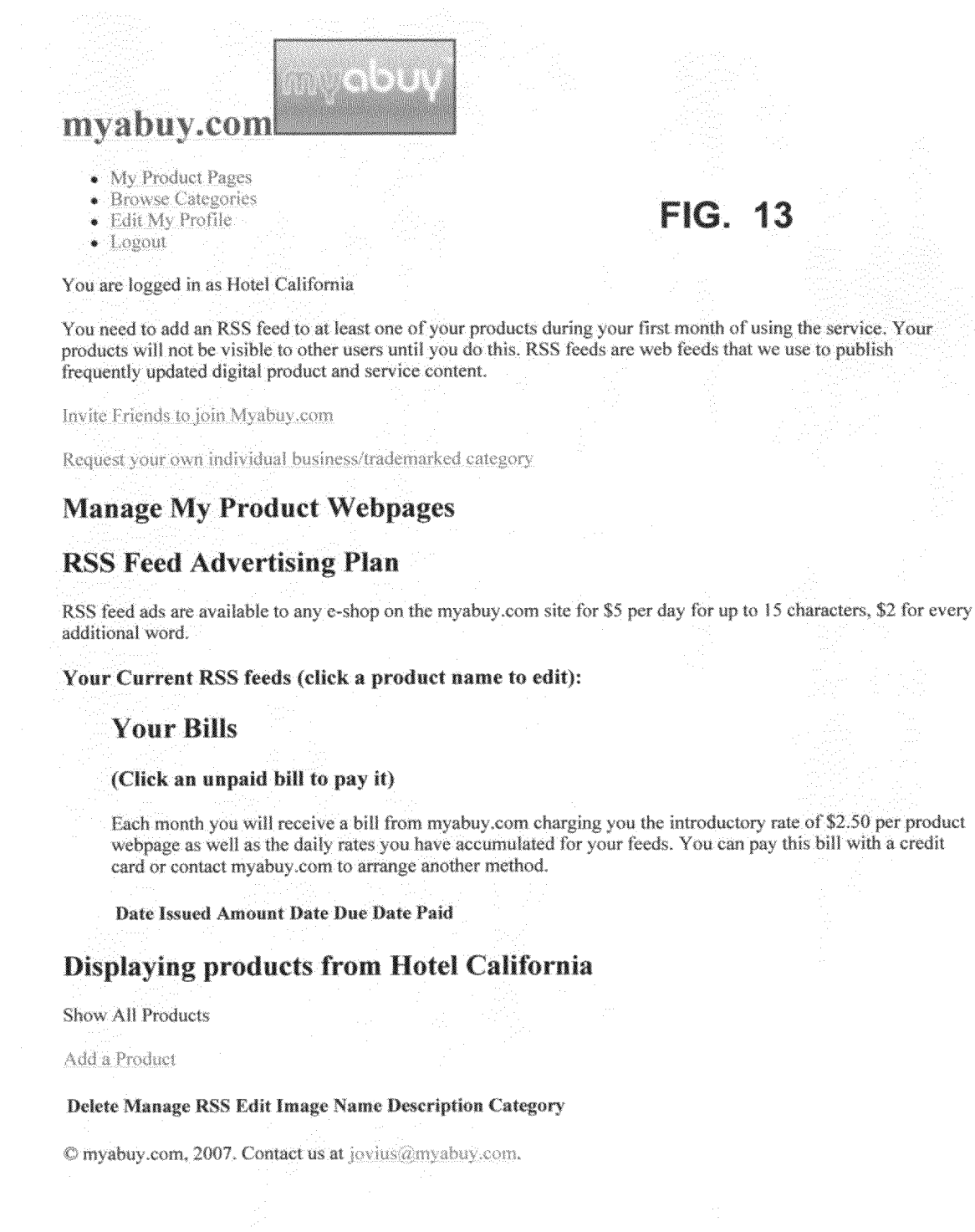
FIG. 13 illustrates a page for managing the products and/or services advertised of the provider/merchant of FIG. 7.
Figure 14A:
FIG. 14 is composed of FIGS. 14A, 14B and 14C that illustrates a sub-page for managing the products where a product is added, or its feed deleted. See also FIG. 15.

As noted above, FIGS. 7 to 14 merely illustrate web page screens and the type of information thereon. Table 1 indicates the steps in the process as illustrates on these screen pages. FIG. 7 illustrates the home page of the website of the online hosting company 104 having a web address of www.myabuy.com. As seen therein, three options are offered: a buyer can become a member; the business provider can become a member; and the business provider can advertise but without a website on the online hosting company 104 by joining but not becoming a member. If you select to become a buyer, FIG. 8 requires that the buyer 102 enter the information requested and further pick the categories of interest as the buyer criteria. On FIG. 9, the buyer can further view specific vendors of the products or services shown. Further, FIG. 10 lists the products and/or services of the online hosting company's website 104. If the business elects to become a member, FIG. 11 requires certain information as well as the categories of products and/or services offered which are the provider/merchant criteria. If one elects not to have a website on the online hosting companies website, FIG. 12 presents required information for that function. A URL link is provided so that if the provider/merchant selects one of the categories as criteria and that corresponds to a criteria of the buyer, then the buyer's computer will be redirected to that URL. FIGS. 13 to 14 allow the provider/merchant to manage the feed information as well as the account associated with that feed.

TABLE 1

Advertiser (provider/merchant) with their own website chooses on the homepage to: Advertise on myabuy RSS feeds only! (No need to log in!)
Advertiser enters their Product/service name.
Advertiser enters their RSS feed advertising text.
Advertiser enters the number of days to display their RSS feed advertising text.
Advertiser enters their URL to link to.
Advertiser chooses a category most relevant to their RSS feed ad or to another parameter they want to target.
Advertiser clicks the box and agrees to the Myabuy.com terms of service.
(Note: Advertisers will see how much this RSS feed ad will cost them after they enter their RSS feed advertising text and the number of days to display their RSS feed advertising text.)
Advertiser clicks OKAY and is directed to the payment section.
Advertiser does not have their own website or wants to take advantage of lower fees chooses on the homepage to Join as a business provider
Advertiser creates a display name.
Advertiser creates a username.
Advertiser creates a password.
Advertiser re-enters this password.
Advertiser enters their e-mail address.
Advertiser composes their signature in any paint program and attaches the file. (This step can later be optional if necessary and does not relate to the scope of the business method patent.)
Advertiser can choose to enter their business address/location.
Advertiser can choose to enter a description of their business.
Advertiser chooses a category most relevant to their business or RSS feed ads or to another parameter they want to target.
Advertiser agrees to the myabuy.com terms of service and that their RSS feed ads and business listings are legal and accurate and click OKAY.
Advertiser comes to a new page that has the sites ad rates to create a RSS ad feed and see "Displaying Products from (their business)" and the text "Show All Products."

The business advertiser must add a product or service by clicking on the hyperlink "Add a Product."
After clicking Add a Product they are prompted to enter their product name, upload any image(s) and type a description of their product.
Advertiser chooses a category most relevant to the product they added or another parameter they want to target.
The advertiser clicks the "Create an RSS feed" hyperlink.
The advertiser then types their RSS advertisement text clicks "Okay" and they have created their own RSS advertising feed or delete the RSS advertisement if they want by clicking."
Advertiser that joins the site can log in at any time using their username and password and edit their category parameters, add a product, delete a product, create a new RSS feed ad, check their bill and pay the bill online, and edit their contact information.
Buyer (user/buyer/customer) chooses on the homepage to 'Join as a buyer"
Buyer enters a new page titled "Create a new buyer"
Buyer first enters their name
Buyer create an username
Buyer enters their email address
Buyer creates a password
Buyer re-enters their password
Buyer can choose to enter their country of residence.
Buyer can choose to enter their gender (Male/Female)
Buyer can choose to enter their age.
Buyer chooses the category(s) most relevant to them or what they are interested in receiving. (These categories are the same as the category the advertiser selected.)
Buyer checks the box that they agree to the sites terms of service and click "Okay!" icon.
Buyer sees the "My personalized products feed" below and clicks the "Get my feed!" hyperlink and subscribes to myabuy RSS feeds of their chosen categories.
My Personalized Products Feed
(RSS Feed Logo Shown)
Get my feed!
Buyer can log into their account at any time using their username, and password and change their information and category(s) their interested in receiving.

The online hosting company 104 may assist in online purchases with the use of the secure database(s) 124 having unique member user/buyer information therein from the member user 102 and thus the member user 102 would not be required to divulge personal information that would otherwise be requested by each individual merchant as may occur if provider/merchant 110 has a website 130 on a third party server. The user/buyer 102 would further select multiple criteria regarding desired products and/or services and to be notified of them through the use of the RSS feed from the online hosting company 104. The online hosting company 104 would match up, link, and filter the providers/merchants 108/110 to the users/buyers 102 based on the criteria provided by both entities.

The online hosting company 104 could further act as a credit/debit card pre-approval source and thus the user/buyer 102 would only have to select items for a shopping cart and hit a payment button which would authorize the credit/debit card bank to credit the merchants account. Moneys from the purchases are placed in the merchant's account with appropriate deductions for chargebacks and/or other fees. The user/buyer 102 would establish an account with the online hosting company and provide conventional credit/debit card information along with a user identification name (ID), a unique password (PW), and an electronic signature (ES), if necessary, for purchases. Any and all of this information may be updated and verified by the online hosting company 104 and the user 102. The member user/buyer 102 would know in advance that a merchant is a member of the Internet hosting company's system as would be indicated by a notice or logo posted therein that this merchant is a member of the online hosting company's system.

Additionally, the merchant 110 having the website 130 hosted by a third party may establish an account with the online hosting company. If the buyer/user 102 selects a product and/or service from this RSS feed, the buyer/user would be redirected to the third party website 130 of the merchant 110 for completing the purchase transaction using the conventional screens as shown in FIGS. 1 to 4. In this respect, certain of the services provided by the online hosting company 104 would not be available to the non-member merchant 110.

It should be understood that communications involving any private and personal information, especially financial information, would be over a secure communications network or over the Internet using appropriate encryption programs.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for facilitating commercial transactions between a user/buyer and a provider/merchant through the Internet comprising:

an online device for providing a plurality of e-shops of provider/merchants having websites for purchasing a merchandise product and/or service therefrom, each e-shop being associated with said online device, the online device being maintained by an online hosting company;

a plurality of online user/buyer devices for accessing each e-shop website, each user of said online user device being a member of said online device, each member user providing unique security information to said online device, said security information from said member user comprising at least a unique user name, a unique user password, an electronic signature, appropriate financial information for processing any purchase of a product and/or service, and delivery information unique to said user, for the purpose of preventing online fraud;

means for an user/buyer to be a first customer on the online hosting company, the user/buyer selecting criteria to define a desired product and/or a service to be advertised through the online hosting company;

means for the provider/merchant to be a second customer of the online hosting company, the provider/merchant selecting criteria to define a product and/or service to be advertised through the online hosting company;

means for matching the user/buyer criteria with the provider/merchant criteria; and means to communicate by the Internet directly to the user/buyer when one or more of the criteria of the user/buyer and the provider/merchant correspond, upon such an occurrence, a RSS feed is sent to the user/buyer that would include pre-approval.

2. The system for facilitating commercial transactions online sales as recited in claim 1, further comprising:

an online device for presenting a plurality of e-shops having websites for purchasing a merchandise product and/ or service therefrom, each e-shop being a member in a first program with said online device comprising at least a RSS feed program;

a plurality of online user devices for accessing each e-shop and its website, each user of said online user device is required to be a member in a second program with said online device for processing a purchase, each member user purchasing a product and/or service must access at least a checkout website screen on said e-shop website, and entering personal and security information from said user of at least a unique user name, a unique user password, and an electronic signature in an account of said user/buyer at the online hosting company;

a financial device comprising a plurality of financial institutions for processing financial information from said users and said provider/merchants; and a shipping device comprising a plurality of shippers for delivering said product at a direction of said member user, said online device providing shipping information to said shipper from personal and security information provided by said member user.

3. The system for facilitating commercial transactions as recited in claim 1, wherein said online device functions as an online mall of the e-shops.

4. The system for facilitating commercial transactions as recited in claim 1, wherein one or more of said plurality of e-shops have websites on a server of said online device.

5. The system for facilitating commercial transactions as recited in claim 1, wherein one or more of said plurality of e-shops have websites communicating to said online device.

6. The system for facilitating commercial transactions as recited in claim 1, further including one or more program means for providing RSS feed information to the provider/merchant, means for providing RSS feeds to user/buyers, and said means for matching the desired product and/or services of the user/buyers with the provider/merchants and providing an RSS feed to the user/buyers upon a match, only upon such an occurrence, a RSS feed is sent to the user/buyer.

7. A method for facilitating commercial transactions between a user/buyer and a provider/merchant through the Internet by a system, comprising the steps of:

providing a means for an user/buyer to be a first customer of an online hosting company, the user/buyer selecting criteria to define a desired product and/or service with the online hosting company;

providing a means for a provider/merchant to be a second customer of the online hosting company, the provider/merchant selecting criteria to define a product and/or service to be advertised through the online hosting company;

providing a means for matching the user/buyer criteria with the provider/merchant criteria; and providing a means to communicate by the Internet directly to the user/buyer when one or more of the criteria of the user/buyer and the provider/merchant correspond;

wherein the online hosting company redirects the user/buyer to a website of the provider/merchant when one or more of the criteria of the user/buyer and the provider/merchant correspond.

8. A method for facilitating commercial transactions between a user/buyer and a provider/merchant through the Internet by a system, comprising the steps of:

providing a means for an user/buyer to be a first customer of an online hosting company, the user/buyer selecting criteria to define a desired product and/or service with the online hosting company;

providing a means for a provider/merchant to be a second customer of the online hosting company, the provider/merchant selecting criteria to define a product and/or service to be advertised through the online hosting company;

providing a means for matching the user/buyer criteria with the provider/merchant criteria; and providing a means to communicate by the Internet directly to the user/buyer when one or more of the criteria of the user/buyer and the provider/merchant correspond.

9. The method for facilitating commercial transactions as defined in claim 8, wherein the online hosting company acts as a pre-approval source for purchases by credit/debit cards, or personal checks, or other forms of payment by the user/buyer to minimize the transfer of personal and financial information to other parties.

10. The method for facilitating commercial transactions as defined in claim 8, wherein the provider/merchant pays per the word used in a RSS feed.

\* \* \* \* \*